United States Patent [19]

Umeda et al.

[11] Patent Number: 4,567,558

[45] Date of Patent: Jan. 28, 1986

[54] ELEVATOR TRAFFIC DEMAND ANALYZING SYSTEM

[75] Inventors: Yasukazu Umeda, Kasugai; Katsunori Takabe, Inazawa, both of Japan

[73] Assignee: Mitsubishi Denki Kabushiki Kaisha, Tokyo, Japan

[21] Appl. No.: 482,057

[22] Filed: Apr. 5, 1983

[30] Foreign Application Priority Data

Apr. 6, 1982 [JP] Japan .................................. 57-56868
Apr. 6, 1982 [JP] Japan .................................. 57-56869

[51] Int. Cl.⁴ ......................... G06F 15/46; B66B 1/00; B66B 1/18

[52] U.S. Cl. ................................ 364/148; 187/29 R; 340/19 R; 340/20

[58] Field of Search .......................... 364/148; 187/29; 340/19 R, 20

[56] References Cited

U.S. PATENT DOCUMENTS

| | | | |
|---|---|---|---|
| 3,593,825 | 7/1971 | Gieseler | 187/29 R |
| 3,967,702 | 7/1976 | Iwaska et al. | 187/29 R |
| 3,999,631 | 12/1976 | Iwasaka et al. | 187/29 R |
| 4,030,572 | 6/1977 | Kaneko et al. | 187/29 R |
| 4,044,860 | 8/1977 | Kaneko et al. | 187/29 R |
| 4,047,596 | 9/1977 | Winkler | 187/29 R |
| 4,411,338 | 10/1983 | Kuzunnki et al. | 187/29 R |
| 4,458,787 | 7/1984 | Uetani | 187/29 R |

OTHER PUBLICATIONS

Hitachi Group Supervisory Control System "CIP-Series" for Elevators; Tatsuo Iwasaka et al., Hitachi R., vol. 28 (1979).

*Primary Examiner*—Jerry Smith
*Assistant Examiner*—Charles B. Meyer
*Attorney, Agent, or Firm*—Leydig, Voit & Mayer Ltd.

[57] ABSTRACT

An improved system for elevator control system is disclosed in which the past traffic demand data that have occurred during a plurality of the same predetermined past unit time periods as the current time period are studied so that these past data may be reflected in the group control of the elevator operation. If the data for a day with different traffic demand from a usual value were studied during the study of past traffic demand that occurred in the course of said predetermined unit time periods, the resulting preestimation would be inaccurate. In view hereof, according to the present invention, any traffic volume data that is markedly different from the traffic demand so far encountered is not studied or, alternatively, the data for a day of the week on which the traffic demand is different from the usual value, such as Sunday, is not studied, thus enabling more accurate preestimation of traffic demand for the unit time period beginning with the current time.

6 Claims, 4 Drawing Figures

ELEVATOR TRAFFIC DEMAND ANALYZING SYSTEM

BACKGROUND OF THE INVENTION

This invention relates to an improved system or apparatus for analysis of elevator traffic demand.

For more efficient operation of a plurality of elevator cars, the tendency is towards resorting to group control in which a most appropriate one of the elevator cars is occasionally selected as a function of changing traffic demand and in response to occurrence of a floor call.

However, it may frequently come to pass that the car most appropriate at the time of the floor call occurrence turns out to be inappropriate due to subsequent changes in traffic demand. Above all, with the instantaneous forecast system, i.e. a system in which a car corresponding to a floor call is indicated by an arrival forecast lamp upon actuation of the floor button, the result of occasionally poor selection is immediately apparent since car allocation, once made, cannot be changed easily.

On the other hand, transistion of traffic demand of a building over a one-day cycle occurs with a substantially fixed pattern.

In this consideration, it has been proposed to get the traffic demand encountered in the past during the same predetermined unit time periods recorded and processed statistically and to perform group control based on the traffic demand thus estimated for the time to come. In this manner, the efficiency of the group control operation may be improved drastically. In this case, the problem relating to the manner in which to process the past traffic volume data of the same unit time periods statistically and the manner in which to preestimate future traffic demand can be dealt with in broadly different ways.

In statistically processing the past traffic demand that occurred during the same predetermined unit time periods for preestimating the traffic demand for the time to come, it is not recommendable to study the data showing obviously different traffic demand from the usual value. For example, traffic demand may be markedly different on a particular day of the week, e.g. Sunday, or on any other day when an exceptionally large number of people visit the building. When the traffic demand data associated e.g. with Sunday are resorted to for traffic demand estimation in addition to the usual data, the resulting value is too small to be used for working days.

SUMMARY OF THE INVENTION

It is therefore an object of the present invention to obviate the above inconvenience and to provide a system for an elevator traffic demand analysis according to which the traffic volume for the near future is preestimated based on the traffic volume value associated with predetermined past unit time periods and any traffic volume value markedly different from the last preestimated traffic volume value is disregarded whereby the traffic volume can be estimated appropriately to provide for more efficient control of the elevator operation in spite of occurrences of sporadically different daily traffic volume values.

For realizing such object, the analysis system according to a preferred embodiment of the present invention comprizes means for measuring the traffic volume values that occurred during a plurality of predetermined unit time periods over a time interval of certain duration up to now and means for preestimating traffic volume values for the near future period based on the thus measured traffic volume values, said preestimating means not using a traffic volume value broadly different from the last preestimated value but using another traffic value for the preestimation of traffic volume values for the near-future period.

It is also an object of the present invention to provide a system for elevator traffic demand analysis according to which traffic volume values associated with predetermined past unit time periods are measured and given priority differently and the thus measured traffic volume values as well as traffic volume data thus given priority are used for preestimating traffic volume for the near future, whereby the traffic volume can be estimated appropriately to provide for more efficient control of the elevator operation in spite of occurrences of sporadically different daily traffic volume values.

For realizing such object, the system according to another preferred embodiment of the present invention comprizes means for measuring traffic volume values that occurred during a plurality of predetermined unit time periods over a time interval of certain duration up to now, means for according priority to the measured traffic volume values and means for preestimating traffic volume for the near-future period based on traffic volume values to which priority has been accorded by said priority according means.

DESCRIPTION OF THE PREFERRED EMBODIMENTS

Figure 1:
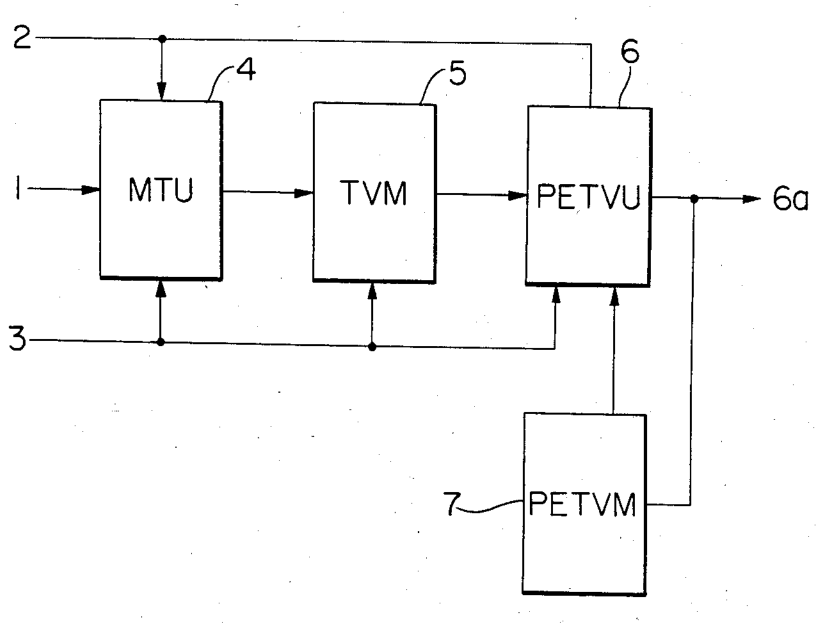
FIG. 1 is a block diagram showing a preferred embodiment of the analysis system according to the present invention.
Figure 2:
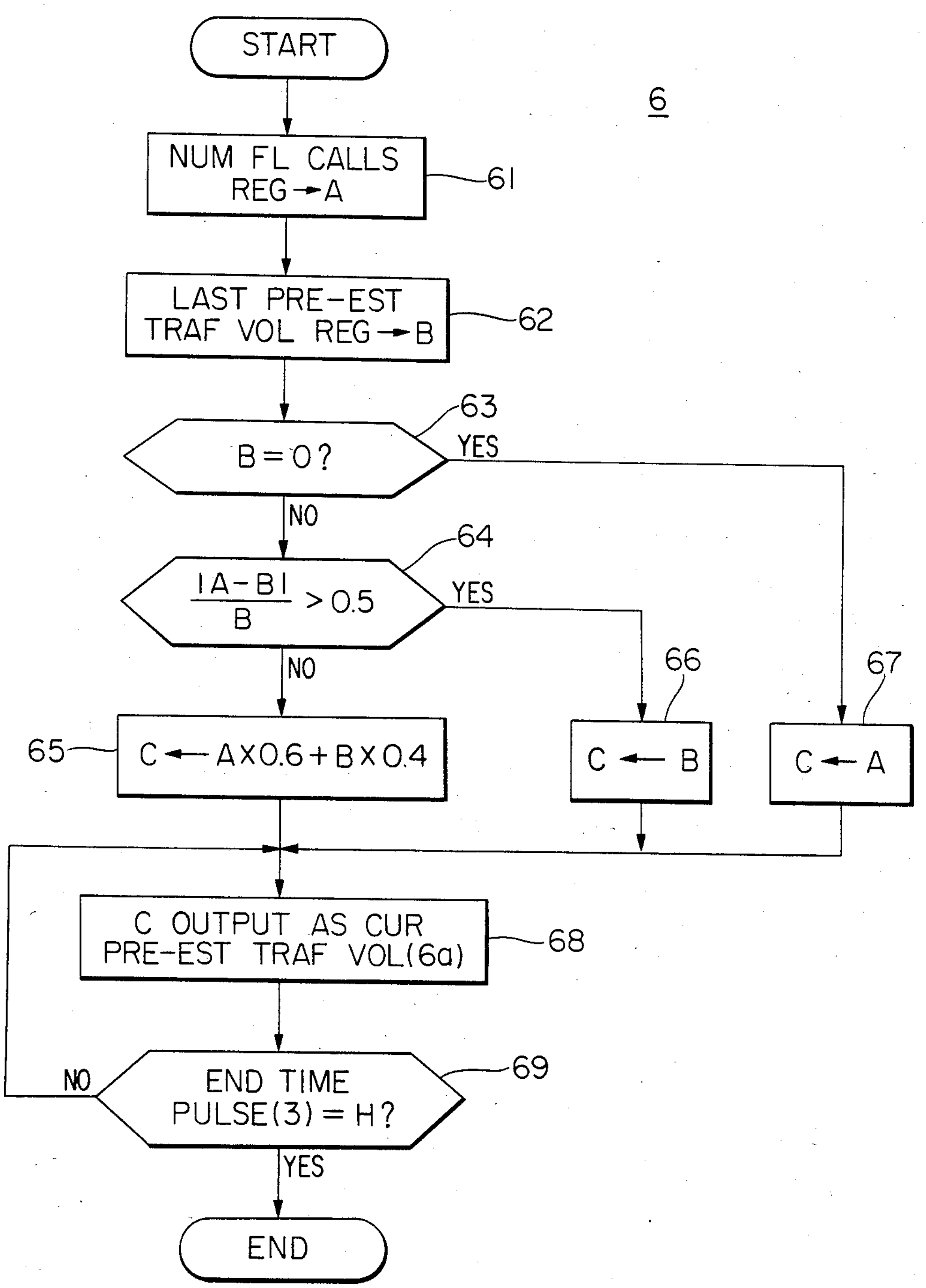
FIG. 2 is a flowchart showing the operational procedure of the traffic volume preestimating unit shown in FIG. 1.

FIGS. 1 and 2 illustrate a first embodiment of the present invention. Although one-day cycle is used in the following description, this is by no means limitative of the present invention.

In the drawings, the numeral 1 designates a floor call pulse which goes high when a floor call is registered. The numeral 2 designates a start time pulse which goes high when it is time for starting measurement of the number of times of floor calls, and the numeral 3 an end time pulse which goes high when it is time to terminate measurement of the number of times of floor calls. The numeral 4 designates a unit for traffic volume measurement (MTU) which counts the floor call pulses 1 since the start time pulse 2 has gone high until the end time pulse 3 goes high and the contents of which are reset shortly after issuance of the end time pulse 3. The numeral 5 designates a traffic volume memory (TVM) which stores the data of the measuring unit 4 as of the time the end time pulse 3 has gone high. The numeral 6 designates a unit adapted for preestimating the traffic volume (PETV) and comprised of a microcomputer performing an operation shown in FIG. 2 when the start time pulse 2 has gone high and outputting a preestimated traffic volume signal 6a corresponding to the number of times of floor calls preestimating until the end time pulse 3 goes high. The unit 6 may be arranged as a digital counter or shift register. The numeral 7 designates a preestimated traffic volume memory (PETVM) for storing the signal 6a. Referring to FIG. 2, blocks 61 through 69 designate operational procedure of the preestimating unit 6.

In the below, the operation of the present embodiment is explained by referring to the case of processing the number of times of floor calls associated with one of a plurality of one-quarter hour periods of a one-day traffic volume cycle, viz. the period from eight until a quarter past eight in the morning. However, the following description applies to any other one-quarter hour periods besides the abovementioned period.

The start time pulse 2 goes high at eight in the morning of a first day and the measuring unit 4 starts to count the floor call pulses 1. The count is incremented each time the floor call is made. The counting operation comes to a close at a quarter past eight when the end time pulse 3 goes high. Simultaneously, the traffic volume memory unit 5 stores the prevailing count value, while the measuring unit 4 is reset to zero. It is now assumed that the count of 120 has been stored in the memory unit 5 at the end of the 8:00–8:15 period of the first day.

On the other hand, the preestimating unit 6 starts the operation shown in FIG. 2 at eight o'clock of the first day when the start time pulse 2 goes high. Thus, in the block 61, the data of the traffic volume memory unit 5 is entered as A. In the block 62, the data of the preestimated traffic volume memory unit 7 is entered as B. If it is assumed that both the memory units 5 and 7 have been reset to zero at the time of start of study operation, A=B=0. Then, the control proceeds from block 63 to block 67 and the data C is set to be equal to A. In the block 68, the data C is output as the preestimated traffic volume for this time. In this case, C=0. In the block 69, it is determined whether the end time pulse 3 is high or not. If the end time pulse 3 is not high, control is returned to the block 68 so that the next data C is output. The above sequence of operations is terminated when the end time pulse 3 goes high, and the preestimated traffic volume data C is stored in the memory unit 7.

The operation of the traffic volume preestimating unit 6 is again started at eight o'clock in the morning of the second day. The data of the preestimated traffic volume memory unit 7 is still zero, while the data of the traffic volume memory unit 5 is 120, so that A=120 and B=0 in the blocks 61, 62, respectively. Control proceeds from the block 63 to the block 67 where C is set to 120. Thus, in the next block 68, the preestimated traffic volume signal 6a equal to 120 is output. The foregoing is the operation of the measurement unit 4 and the memory unit 5 during the 8:00–8:15 period of the second. It is now assumed that the number of times the floor calls have occured during this period of the second day is equal to 150.

In the operation of the preestimating unit 6 for the third day, A=150 and B=120 in the blocks 62 and 63 respectively and thus control proceeds through blocks 63, 64. In the block 64, it is determined whether the ratio of the absolute value of the difference between the values of A and B to the value of C is larger than a predetermined value e.g. 0.5. Here, the ratio $$\frac{|A-B|}{B} = \frac{150-120}{120} = 0.25 < 0.5$$

and thus control proceeds to block 65, where an arithmetic operation $C = A \times 0.6 + B \times 0.4 = 150 \times 0.6 + 120 \times 0.4 = 138$ is made. Hence, the value of 138 is output as preestimating traffic volume signal 6a for the eight until a quarter past eight period of the third day. It is assumed that 155 floor calls have been made during this period of the third day and that 46, 160, 172, 167, 280, 177 and 179 floor calls have been made during the 8:00–8:15 periods of the fourth through tenth days, respectively. The preestimated traffic volume signal 6a for the fourth day is 148 by having the result of the operation rounded to an integer. Since the number of times of the floor calls for the fourth day in 46, in the procedure 64 of the fifth day, the ratio $$\frac{|A-B|}{B} = \frac{146-46}{148} = 0.69 > 0.5$$

so that control proceeds to block 66 where C=B=148. In this manner, the data of the number of times of floor calls for the fourth day is disregarded and the preestimated traffic volume signal 6a for the fourth day is used as it is as the preestimated traffic volume signal 6a for the fifth day. The numbers of times of floor calls and the preestimated traffic volume signals 6a are as tabulated in the Table below.

| day | Number of times of floor calls | preestimated traffic volume signal (6a) |
|---|---|---|
| 1st | 120 | 0 |
| 2nd | 150 | 120 |
| 3rd | 155 | 138 |
| 4th | 46 | 148 |
| 5th | 160 | 148 |
| 6th | 172 | 155 |
| 7th | 167 | 165 |
| 8th | 280 | 166 |
| 9th | 177 | 166 |
| 10th | 179 | 173 |
| 11th | — | 177 |

It is seen from the above example that the number of times of floor calls for the fourth day is abnormally small and that for the eighth day is abnormally large. In the present example, the number of times of floor calls lesser than the preestimated value obtained last time by a factor of 2 is deemed to be an abnormal traffic demand value and disregarded in the preestimation. It should be noted that the factor may be different from 2 and that the traffic demand may be deemed to be unusual when the difference |A−B| exceeds e.g. 100.

In the above Table, the numbers of times of floor calls for the days preceding the first day are assumed to be zero. Alternatively it is possible to substitute these values with any arbitrarily selected values for the floor calls expected to occur in consideration of the state of use of the building. In this case, the preestimated traffic signal 6a may be used more reliably from the outset as a basis for group control.

In the foregoing, the data for the numbers of times of floor calls are used as data to be studied for estimating the traffic demand. However, this is not limitative of the present invention. For instance, these data may be replaced by the number of passengers getting into or getting off from the car, the total number of passengers, the number of times of car calls, the data indicative of various traffic demand states such as number of times of jamming of the car with passengers, the data indicative of service states such as waiting time durations, the data concerning power consumption and the like.

The preestimated traffic volume signal 6_a_ may be used for call allocation, setting of the waiting floor for the car, estimation of the arrival time, setting of the load center for divisional driving (viz. the floor to be the boundary of the divisional driving), the numbers of allocated cars, the door opening and closure time or the number of cars in operation, automatic call registration or the like, while, in the foregoing, the control example making use of the preestimated traffic signal 6_a_ has not been described specifically.

The present invention is also not limited to the 8 o'clock to a one quarter past 8 o'clock period.

The number of times of floor calls may be computed according to the respective floors or the car operating directions.

In the embodiment of FIG. 2, the data for the preceding day and the data for the second preceding day et seq. are taken into account with the weight factors of 0.6 to 0.4, respectively, in order to give priority to the data for the preceding day which is nearer to the current day. However, this also is not limitative of the present invention. For example, separate weight factors may be allocated to the respective days such as $\frac{1}{2}$ for the preceding day, $\frac{1}{2}^{2}$ for the second preceding day, $\frac{1}{2}^{3}$ for the third preceding day, $\frac{1}{2}^{4}$ for the fourth preceding day, and so forth.

According to the aforementioned first embodiment of the present invention, the traffic volume data for the predetermined unit time periods are entered for estimating the near-future traffic demand and, in case of entry of a traffic volume markedly different from the preestimated traffic volume value obtained last time, that data is not used, but other more pertinent data are used for estimating the traffic volume. In this manner, it is possible to make a more appropriate estimation of the traffic demand to provide for more efficient control of the elevator operation in spite of occurrence of sporadically different daily traffic volume values.

Figure 3:
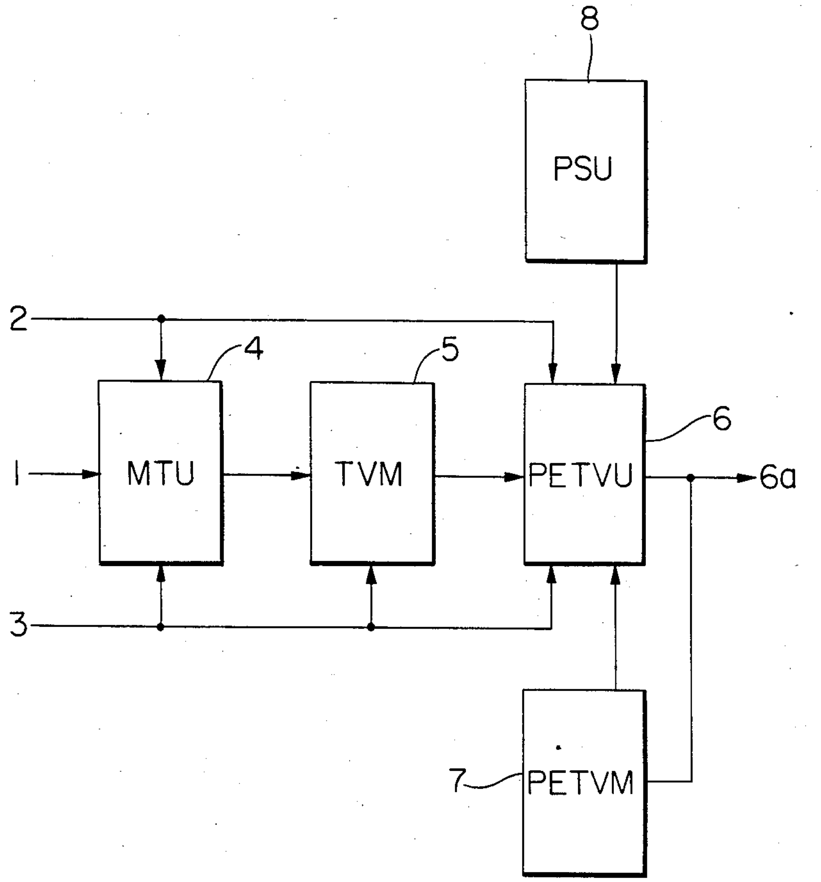
FIG. 3 is a block diagram showing an analysis system according to a second embodiment of the present invention.
Figure 4:
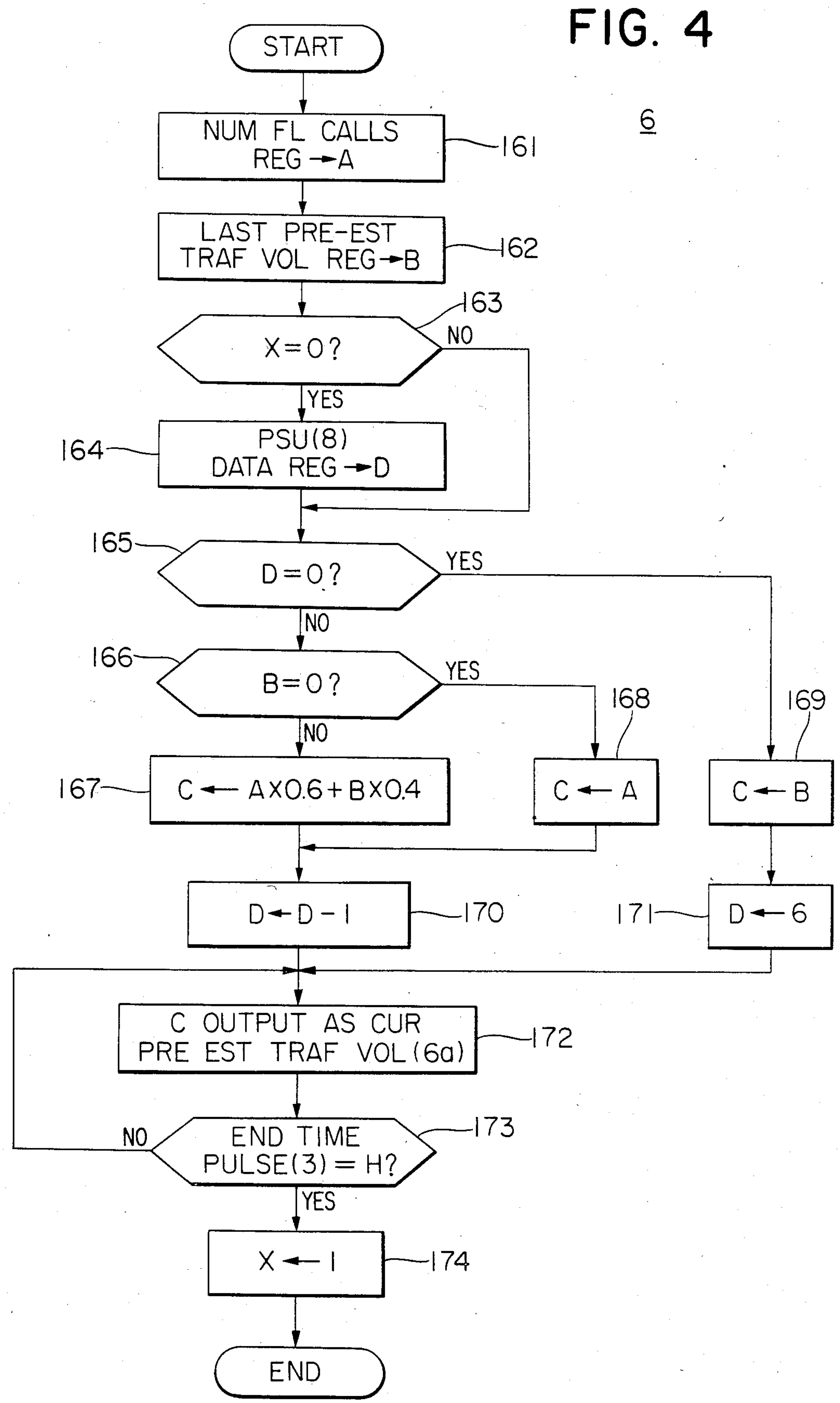
FIG. 4 is a flowchart showing the operational procedure of the traffic volume preestimating unit shown in FIG. 3.

Reference is made to FIGS. 3 and 4 illustrating a second embodiment of the present invention.

In FIG. 3, the parts indicated by the same reference numerals as those used in FIG. 1 are equivalent to the corresponding parts shown in FIG. 1 and hence the description of these parts is omitted for simplicity. In addition to the components of the first embodiment, there is provided a priority setting unit (PSU) 8 in this second embodiment whereby the data priority is changed in accordance with days of the week in the manner described below.

In FIG. 4, the blocks 161 through 173 designate the operational procedure for the traffic volume preestimating unit 6.

In the below, the operation of the present embodiment is explained by referring to the case of studying or processing the number of times of floor calls associated with one of a plurality of one-quarter hour periods of a one-day traffic volume cycle, viz. the eight o'clock to a quarter past eight o'clock interval in the morning. However, the following description may apply to any other one-quarter periods hour besides the abovementioned period.

The start time pulse 2 goes high at eight in the morning of a first day and the measuring unit 4 start to count the floor call pulses 1. The count is incremented each time the floor call is made. The counting operation comes to a close at a quarter past eight o'clock when the end time pulse 3 goes high. Simultaneously, the traffic volume memory unit 5 stores the prevailing count value, while the measuring unit 4 is reset to zero. It is now assumed that the count of 120 has been stored in the memory unit 5 at the end of the 8:00–8:15 period of the first day.

On the other hand, the preestimating unit 6 starts the operation shown in FIG. 4 at eight o'clock of the fisrt day when the start time pulse 2 goes high. Thus, in the block 161, the data of the memory unit 5 is entered as A. In the block 162, the data of the memory unit 7 is entered as B. If assumed that both the memory units 5 and 7 have been reset to zero at the time of start of study operation, $A=B=0$. With X set to zero for the first day, control proceeds from block 163 to block 164 where the data of the priority setting unit 8 is entered as D. In the present embodiment, when the first day falls on Sunday, 1 is set as D. Similarly, when the first day falls on Monday, Tuesday, Wednesday, Thursday, Friday and Saturday, 0, 6, 5, 4, 3 and 2 are set as D, respectively. Assuming the first day to be Thursday, $D=4$ and control proceeds from block 165 to block 166. Since $B=0$, control proceeds to block 168 where $A=0$ is set as C. In the block 170, $D-1$ is set to be D for operation on the next day, so that $D=3$. In the block 172, the preestimated traffic volume signal 6_a_ or $C=0$ is output. In the block 173, it is determined whether the end time pulse 3 is high or not. If the pulse 3 is not high, control is returned to the block 172 so that the next signal C is output. When the end time pulse 3 goes high, control proceeds to block 174 where X is set to be 1 and the operation is terminated. The preestimated traffic volume signal C is stored in the memory unit 7.

The operation of the preestimating unit 6 is again started at the same time point on the second day, which is Friday. The data of the preestimated traffic volume memory unit 7 is still zero, while the data of the traffic volume memory unit 5 is 120, so that $A=120$ and $B=0$ in the blocks 161, 162, respectively. Since X is set to 1, control proceeds from block 163 to block 164, skipping the block 165. Thus the priority setting unit 8 is used solely for setting the day of the week for the first day and the actual priority setting is done by programming. Since $D=3$, control proceeds to block 166. Since $B=0$, control proceeds through blocks 168, 170 and 172 and $C=A=120$ is output as preestimated traffic volume signal 6_a_. On the other hand, D is set to 2. The above is the operation of the traffic volume measurement and preestimating units 4 and 5 for the second day. It is now assumed that the number of times of floor calls during this 8:00–8:15 period of the second day is equal to 150.

In the operation of the preestimating unit 6 on the next third day, which is Saturday, $A=150$ and $B=120$ in the block 161 and 162 while $X=1$ so that control proceeds from block 163 through blocks 165, 166 and 167 and the operation $C=A\times0.6+B\times0.4=150\times0.6+120\times0.4=138$ is performed. Therefore, the data C equal to 138 is output for this day as preestimated traffic volume signal 6_a_ for this 8:00–8:15 period of the third day. In the block 170, D is set to 1. It is assumed that 155 floor calls have occurred during this 8:00–8:15 period of the third day.

On the fourth day, which falls on Sunday, $C=155\times0.6+138\times0.4=148$ is the preestimated traffic volume signal 6*a*. In the block 170, D is set to zero. Since it is Sunday, it is assumed that 15 floor calls have occurred during the said time period.

On the fifth day, which falls on Monday, since $D=0$, control proceeds from block 165 to block 169 so that the data C is same as the preestimated traffic volume B obtained on the previous day. In this manner, the data C is 148 as before and output in the block 172. In the block 171, D is set to 6 so that D is again zero only after the lapse of further seven days.

It should be noted that the preestimated traffic volume signal 6*a* for Sunday is 148 in the present embodiment which is different from the number of times of floor calls expected to occur on Sunday. However, since it is obviously Sunday, it is more preferred to find out the preestimated traffic volume signal 6*a* for Sunday by some other means. In other words, preestimation of the traffic volume may be effected separately for each Sunday in the manner described above.

In this context, when the traffic demand of a building is different on Friday from that on other days of the week, traffic demand can be measured for each day of the week and the resulting data processed as described in the foregoing. In other words, the operation shown in FIG. 4 is performed for each day of the week and the procedure of the block 167 is carried out when the operation is so indicated in the block 166. It is apparent that one of the seven rows of operations corresponding to the seven days of the week will perform an operation shown in the block 167.

On national holidays or on days on which special events are held in the building, in addition to Sundays or other designated days of the week, the study operation should be dispensed with. These days can be set by electrical switches.

Alternatively, small weight factors can be used for these days on which study operation should be dispensed with. For example, in the block 169, $A\times0.2+B\times0.8$ can be set to be C instead of setting B to be C. In this manner, greater emphasis can be placed on the traffic volume signal 6*a* of the preceding day than on the data on the current day.

In the foregoing, the numbers of times of floor calls for the days preceding the first day are assumed to be zero. Alternatively it is possible to substitute these values by any arbitrarily selected values for floor calls that are expected to occur in consideration of the state of use of the building. In this case, the preestimated traffic data may be used more reliably from the outset as a basis for group control operation.

In the above embodiment, the data for the numbers of times of floor cells are used as data to be studied for estimating the traffic demand. However, this is not limitative of the present invention. For instance, these data may be replaced by the number of passengers getting into the car or getting off from the car, the total number of passengers, the number of times of car calls, the data indicative of various traffic demand states such as number of times of jamming of the car with passengers, the data indicative of service states such as waiting time duration, the data concerning power consumption and the like.

The predetermined traffic volume signal 6*a* may be used for call allocation, setting of the waiting floor for the car, estimation of arrival time, setting of the load center for divisional driving (viz. the floor to be the boundary of the divisional driving), the numbers of allocated cars, the door opening and closure time or the number of cars in operation, automatic call registration or the like, while, in the foregoing, the control example making use of the preestimated traffic signal 6*a* has not been described specifically.

The present invention is also not limited to the 8 o'clock to a quarter past 8 o'clock period.

The number of times of floor calls may be computed according to the respective floors or the car operating directions.

In the above embodiment, the data for the preceding day and the data for the second preceding day et seq. are taken into account with the weight factors of 0.6 to 0.4, respectively, in order to give priority to the data for the day nearer to the current day. However, this again is not limitative of the present invention. For example, separate weight factors may be allocated to the respective days under consideration such as factor $\frac{1}{2}$ for the preceding day, $\frac{1}{2}^2$ for the second preceding day, $\frac{1}{2}^3$ for the third preceding day, $\frac{1}{2}^4$ for the fourth preceding day and so forth.

According to the aforementioned second embodiment of the present invention, traffic volume data during predetermined past unit time periods of the one-day traffic volume cycle are measured and given priority differently, these data being used for deriving an preestimated traffic volume for the near-future time periods, so that the traffic volume can be estimated appropriately to provide for more efficient control of the elevator operation in spite of occurrence of sporadically different daily traffic volume values.

What is claimed is:

1. A system for controlling a plurality of elevator cars according to a varying traffic demand wherein the demand is divided into a plurality of time cycles which, in turn, are divided into a plurality of corresponding time periods, said system comprising:

means for generating in each cycle a value indicative of the measured traffic demand in at least one period in the cycle, the periods for which the measured values are generated corresponding from one cycle to another;

first storage means for storing in each cycle the measured values for at least the immediately preceding corresponding period;

means for generating in each cycle a value indicative of an estimated traffic demand for a corresponding period subsequent to the preceding corresponding period, said estimated value generating means including first estimating means for generating an estimated value in accordance with the measured value in the first storage means, second estimating means for generating an estimated value equal to a previously generated estimted value, and means for selecting between the first estimating means and the second estimating means; and means for selectively controlling at least one elevator car in accordance with the estimated value generated by the estimated value generating means.

2. The system as claimed in claim 1 further comprising a second storage means for storing in each cycle the estimated value generated by the estimated value generating means, said first generating means generating an estimated value further in accordance with a previous estimated value stored in the second storage means.

3. The system as claimed in claim 2 wherein the selecting means includes means for determining if the measured value in the first storage means differs from the estimated value in the second storage means by more than a predetermined value or ratio, said selecting means selecting said second estimating means if the measured value does so differ from the estimated value.

4. The system as claimed in claim 2 wherein the first storage means stores only the measured value for the preceding corresponding period and wherein the second storage means stores only the estimated value for the preceding corresponding period.

5. The system as claimed in claim 2 further comprising means for giving priority to the measured values for corresponding periods and wherein said selecting means includes means for determining if the measured value in the first storage means has priority, said selecting means selecting the first estimating means if the measured value has priority.

6. The system as claimed in claim 5 wherein said priority giving means includes means for assigning priority to each measured value in accordance with the day of the week on which the measured value has been recorded, said assigning means not assigning priority to the measured value recorded on a day of the week on which the traffic demand is different from that on the remaining days of the week and said selecting means selecting the second estimating means for measured values which have no priority.

* * * * *